United States Patent
Wiest et al.

(10) Patent No.: US 9,097,567 B2
(45) Date of Patent: Aug. 4, 2015

(54) ULTRASONIC, FLOW MEASURING DEVICE

(75) Inventors: Achim Wiest, Weil am Rhein (DE); Andreas Berger, Hasel-Glashutten (DE); Sascha Grunwald, Steinen (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/232,385

(22) PCT Filed: Jun. 6, 2012

(86) PCT No.: PCT/EP2012/060704
§ 371 (c)(1),
(2), (4) Date: Jan. 13, 2014

(87) PCT Pub. No.: WO2013/010720
PCT Pub. Date: Jan. 24, 2013

(65) Prior Publication Data
US 2014/0144247 A1    May 29, 2014

(30) Foreign Application Priority Data
Jul. 15, 2011 (DE) .......................... 10 2011 079 250

(51) Int. Cl.
*G01F 1/66* (2006.01)

(52) U.S. Cl.
CPC . *G01F 1/66* (2013.01); *G01F 1/662* (2013.01)

(58) Field of Classification Search
USPC ............................... 7/861.31, 861.27, 861.29
See application file for complete search history.

(56) References Cited

U.S. PATENT DOCUMENTS

| 4,831,884 A | | 5/1989 | Drenthen | |
|---|---|---|---|---|
| 5,546,812 A | * | 8/1996 | Drenthen | 73/861.29 |
| 5,650,572 A | * | 7/1997 | Vontz | 73/861.28 |
| 6,098,466 A | * | 8/2000 | Shkarlet | 73/861.25 |
| 7,152,490 B1 | * | 12/2006 | Freund, Jr. et al. | 73/861.27 |
| 7,469,598 B2 | * | 12/2008 | Shkarlet et al. | 73/861.18 |
| 7,845,240 B1 | | 12/2010 | Stehouwer | |

(Continued)

FOREIGN PATENT DOCUMENTS

| DE | 29719730 U1 | 1/1999 |
|---|---|---|
| DE | 19861073 A1 | 4/1999 |

(Continued)

OTHER PUBLICATIONS

English translation of the IPR, WIPO, Geneva, Jan. 30, 2014.

(Continued)

*Primary Examiner* — Jewel V Thompson
(74) *Attorney, Agent, or Firm* — Bacon & Thomas, PLLC

(57) ABSTRACT

An ultrasonic, flow measuring device, including a measuring tube a transmitter a receiver and at least a first reflection surface. An acoustic signal incident on a first reflection surface and an acoustic signal reflected on the first reflection surface travel, in each case, along a straight subsection of the first signal path. The transmitter, the receiver and the first reflection surface are so oriented with respect to one another and arranged in or on the measuring tube that the acoustic signal on the first signal path from the first transmitter to the first receiver is so reflected on the first reflection surface that the sum of all lengths of all subsections as projected on a measuring tube axis, extending in a first plane parallel to the measuring tube axis, and having a predetermined separation other than zero from the measuring tube axis has a predetermined value different from zero.

10 Claims, 3 Drawing Sheets

(56) References Cited

U.S. PATENT DOCUMENTS 8,181,536 B2 * 5/2012 Augenstein et al. ....... 73/861.28
2002/0124661 A1 9/2002 Wagner

FOREIGN PATENT DOCUMENTS

| | | |
|---|---|---|
| DE | 29803912 U1 | 5/1999 |
| EP | 0268314 A1 | 5/1988 |
| EP | 0715155 A1 | 6/1996 |
| EP | 1255094 A2 | 11/2002 |
| EP | 2282178 A1 | 2/2011 |
| WO | 0244662 A1 | 6/2002 |

OTHER PUBLICATIONS

German Search Report, PTO Munich, Mar. 1, 2012.
International Search Report, The Netherlands, Aug. 7, 2012.

* cited by examiner

ULTRASONIC, FLOW MEASURING DEVICE

TECHNICAL FIELD

The present invention relates to an ultrasonic, flow measuring device, which includes a measuring tube having a straight measuring tube axis, a transmitter for sending an acoustic signal on a first signal path, a receiver for receiving the acoustic signal on the first signal path, and at least a first reflection surface, on which the acoustic signal on the first signal path is reflected, in each case, at least once, wherein the acoustic signal incident on the first reflection surface and the acoustic signal reflected on the first reflection surface each travel along straight subsections of the first signal path.

BACKGROUND DISCUSSION

Ultrasonic, flow measuring devices are applied widely in process and automation technology. They permit easy determination of volume flow and/or mass flow in a pipeline.

Known ultrasonic, flow measuring devices frequently work according to the travel-time difference principle. In the travel-time difference principle, the different travel times of ultrasonic waves, especially ultrasonic pulses, i.e. so-called bursts, are evaluated as a function of the direction the waves travel in the flowing liquid. To this end, ultrasonic pulses are sent at a certain angle to the tube axis both with, as well as also counter to, the flow. From the travel-time difference, the flow velocity, and therewith, in the case of known diameter of the pipeline section, the volume flow, can be determined.

The ultrasonic waves are produced, respectively received, with the assistance of so-called ultrasonic transducers. To this end, ultrasonic transducers are placed securely in the tube wall of the relevant pipeline section. There are also clamp on, ultrasonic, flow measuring systems. In such case, the ultrasonic transducers are pressed externally on the wall of the measuring tube. A great advantage of clamp on, ultrasonic, flow measuring systems is that they do not contact the measured medium and can be placed on an already existing pipeline.

The ultrasonic transducers are normally composed of an electromechanical transducer element, e.g. a piezoelectric element, and a coupling layer. In the electromechanical transducer element, the ultrasonic waves are produced as acoustic signals and led via the coupling layer to the pipe wall and from there into the liquid in the case of clamp-on-systems, and, in the case of inline systems, via the coupling layer into the measured medium. In such case, the coupling layer is sometimes called a membrane.

Between the piezoelectric element and the coupling layer, another coupling layer can be arranged, a so called adapting, or matching, layer. The adapting, or matching, layer performs, in such case, the function of transmitting the ultrasonic signal and simultaneously reducing reflection at interfaces between two materials caused by different acoustic impedances.

Both in the case of clamp-on-systems, as well as also in the case of inline systems, the ultrasonic transducers are arranged on the measuring tube in a shared plane, either on oppositely lying sides of the measuring tube, in which case the acoustic signal, projected onto a tube cross section, passes once along a secant through the measuring tube, or on the same side of the measuring tube, in which case the acoustic signal is reflected on the oppositely lying side of the measuring tube, whereby the acoustic signal traverses the measuring tube twice along the secant projected on the cross section through the measuring tube. U.S. Pat. Nos. 4,103,551 and 4,610,167 show ultrasonic, flow measuring devices with reflections on reflection surfaces provided therefor in the measuring tube. Also known are multipath systems, which have a number of ultrasonic transducer pairs, which, in each case, form a signal path, along which the acoustic signals pass through the measuring tube. The respective signal paths and the associated ultrasonic transducers lie, in such case, in mutually parallel planes parallel to the measuring tube axis. U.S. Pat. Nos. 4,024,760 and 7,706,986 show such multipath systems by way of example. An advantage of multipath systems is that they can measure the profile of the flow of the measured medium in the measuring tube at a plurality of locations and thereby provide highly accurate, measured values for the flow. This is achieved based on, among other things, the fact that the individual travel times along the different signal paths are weighted differently. Disadvantageous in the case of multipath systems is, however, their manufacturing costs, since several ultrasonic transducers and, in given cases, a complex evaluating electronics need to be used.

There are different approaches for weighting the signal paths. The paper "Comparsion of integration methods for multipath accoustic discharge measurements" by T. Tresch, T. Staubli and P. Gruber in the handout for 6th International Conference on Innovation in Hydraulic Efficiency Measurements, 30 Jul.-1. Aug. 2006 in Portland, Oreg., USA, compares established methods for weighting the travel times along different signal paths for calculating the flow.

German Patents DE 198 61 073 A1 and DE 297 19 730 U1 disclose flow measuring systems having a first sound path, which is reflected a number of times in the measuring tube.

U.S. Pat. 7,845,240 and European Patent EP 2 282 178 A1 disclose flow measuring devices, which from a transmitter transmit a first signal path, which via a double refraction leads a signal to a receiver. Then the receiver assumes the function of a transmitter and transmits an ultrasonic signal on a second signal path by means of a double reflection or multi-reflection back to the original transmitter, which then assumes the function of a receiver. This measuring arrangement includes signal evaluation, which takes into consideration the values of the first and second signal paths. Disadvantageous here is that during the traveling of the first and second signal paths the properties of the flow have already changed, so that, for example, a rotation of the medium in the measuring tube is not taken into consideration, since it is only registered in one direction, not, however, in the opposing direction.

European Patent EP 0715 155 A1 discloses a measuring arrangement involving multiple refraction, wherein the subsections of the signal path form only one plane, which extends parallel to the measuring tube axis. In this case, for example, a rotation of the medium in the tube cannot be compensated.

Published International Application WO 02/44662 A1 discloses a flow measuring device, in the case of which a signal is led on a signal path through a measuring tube and experiences multiple reflections. In such case, the subportions of the signal path form a single plane, which extends parallel to the measuring tube axis. Also here, for example, no rotation compensation can occur.

Published International Application WO 1995012110 A1 discloses an ultrasonic, flow measuring device having a measuring tube with planar walls and a straight measuring tube axis and at least one reflection surface in the measuring tube, wherein a normal to this reflection surface has three components different from zero in a right angled coordinate system, whose one axis corresponds to the measuring tube axis. This document teaches that an ultrasonic signal of predetermined width, which is markedly greater than a point shaped signal, has a Gauss shaped sensitivity across this width. This signal is used for flow measurement. The width of the signal corresponds, in such case, approximately to the width of the rectangular measuring tube. If such a signal would pass through the measuring tube parallel to the side walls, the region with the highest sensitivity would extend through the center region of the measuring tube, and, thus, also record the higher flow velocities with higher values. In the case of very small flow velocities, this would lead to a measurement error. The document teaches consequently, further, to irradiate the measuring tube largely homogeneously by leading the ultrasonic signals through all regions of the measuring tube by means of directed reflections. For illustration, the broad ultrasonic signal was represented by individual beam portions. The path lengths of the individual beam portions are equally long, so that the beam portions do not cancel by interference.

SUMMARY OF THE INVENTION

An object of the invention is to provide an ultrasonic, flow measuring device, which ascertains flow highly accurately and also is cost effective to manufacture.

The object is achieved by the subject matter of the independent claims 1. Further developments and embodiments of the invention are provided by the features of the respective dependent claims.

An ultrasonic, flow measuring device of the invention includes for flow measurement a measuring tube having a straight measuring tube axis, at least a first transmitter for sending an acoustic signal on a first signal path, at least a first receiver for receiving the acoustic signal on the first signal path and at least a first reflection surface, wherein the transmitter, the receiver and the first reflection surface are so oriented with respect to one another and arranged in or on the measuring tube that the acoustic signal on the first signal path from the first transmitter to the first receiver is so reflected on the first reflection surface that the sum of all lengths of all first subsections of the first signal path as projected on the measuring tube axis and having a predetermined first separation other than zero from the measuring tube axis, which first subsections extend in a first plane parallel to the measuring tube axis, has a predetermined first value different from zero and wherein the sum of all lengths of all second subsections of the first signal path as projected on the measuring tube axis and having the first separation from the measuring tube axis, which second subsections extend in a second plane different from the first plane and parallel to the measuring tube axis, has the predetermined first value, wherein the first plane extends in a first half of the measuring tube and, wherein the second plane extends in a second half of the measuring tube, wherein the first half of the measuring tube, more exactly stated the first plane of the first half, has no overlap with the second half, more exactly stated the second plane of the second half, of the measuring tube.

The terminology "halves" is meant here colloquially, i.e. two tube segments, respectively sections, which can have lengths equal to one another, but which, however, can also have different lengths. Thus, the first half, respectively the first tube section, can have a length equal to or different from the second half, respectively the second tube section.

The claimed arrangement of the first and second planes means especially also that flow components can be taken into consideration for compensating for a rotary movement of the medium in the measuring tube during measuring.

In such case, registering of the flow components using a single signal path is possible, so that only one transmitter and one receiver are required. Moreover, the measurement result is directly available after passing through the signal path and no second signal path is needed for evaluation.

The signal on first signal path includes a directional component in or counter to the direction of the measuring tube axis. The first and second planes do not coincide.

Serving both as transmitter as well as also receiver are usually ultrasonic transducers, especially electromechanical transducers, e.g. piezoelectric elements, which are suitable to send as well as also to receive the acoustic signal, especially an ultrasonic pulse or one or more ultrasonic waves. If ultrasonic transducers are applied as transmitters and receivers, the acoustic signal can pass along the first signal path back and forth, thus in two directions. Transmitter and receiver are, thus, exchangeable.

In an embodiment of the invention, the transmitter is suitable for receiving an acoustic signal on the first signal path and the receiver is suitable for sending the acoustic signal on the first signal path. The transmitter and receiver are ultrasonic transducers, especially ultrasonic transducers with electromechanical transducer elements, e.g. piezoelectric transducer elements.

Referred to as signal path, also called acoustic path, is the path of the acoustic signal, thus e.g. the ultrasonic wave or the ultrasound pulse, between the transmitter, which transmits the acoustic signal, and the receiver, which receives the acoustic signal. In an embodiment of the invention, the acoustic signal is, such as usual in the case of an inline system, radiated perpendicularly to the membrane. The receiver is then so emplaced in or on the measuring tube that the signal, in turn, strikes perpendicularly on its membrane.

Designated as an acoustic signal is especially a sound wave or a packet of sound waves. Serving as reflection surface is an interface, e.g. one formed between measured medium and measuring tube or a reflector arranged on or in the measuring tube. In an embodiment of the invention, the reflection surface is a surface of a reflector separately arranged in the measuring tube and contacting the measured medium during operation of the ultrasonic, flow measuring device.

In an embodiment of the invention, the acoustic signal is transmitted perpendicularly to a membrane of a first ultrasonic transducer serving as transmitter and received perpendicularly to a membrane of a second ultrasonic transducer serving as receiver, wherein the two ultrasonic transducers are so oriented relative to the reflection surface that the acoustic signal is reflected on the reflection surface to the second ultrasonic transducer.

The orientation of the reflection surface occurs e.g. via the angle bisector between the acoustic signal incident along a straight subsection and the acoustic signal reflected along another straight subsection. The angle bisector is the normal to the reflection surface. In an embodiment of the invention, the normal to the first reflection surface intersects the measuring tube axis perpendicularly.

The separation of two paths or lines is defined here as usual in mathematics. If two lines, including also the straight subsections, the measuring tube axis or even section lines or lines of intersection, are skew to one another in space, the separation of the one line to an auxiliary plane parallel to it is calculated, in which plane the other line lies.

Two lines, which are not coincident and which have no shared point of intersection, always have a separation greater than zero relative to one another. This is measured by the length of the normal between the two lines, which is perpendicular to both lines. Even for lines skewed to one another, a normal exists. Therefore, a plane can be constructed, in which one line lies, and which is parallel to the other line. Thus, a first plane can be constructed, in which the first line lies and which is parallel to the measuring tube axis. Analogously, there exists a second plane parallel to the measuring tube axis in which the second line lies. According to the invention, the acoustic signal on the first signal path is reflected on the first reflection surface, wherein, according to an example of an embodiment, the acoustic signal incident on the first reflection surface propagates along the first straight subsection in a first plane parallel to the measuring tube axis, which first plane has the first separation from the measuring tube axis, and wherein the acoustic signal reflected on the first reflection surface propagates along the second straight subsection in a second plane parallel to the measuring tube axis, which second plane has the second separation from the measuring tube axis. The first plane would be tangent to a first straight circular cylinder with the first separation as radius of its base, along a line parallel to the measuring tube axis, which is part of its lateral surface, exactly as the second plane would be tangent to a second straight circular cylinder with the second separation as radius of its base. Both planes intersect in a line of intersection extending parallel to the measuring tube axis. The line of intersection lies, in such case, especially in the region of the first reflection surface. In the model on which this is based, the acoustic signals propagate along straight subsections. Therefore, the line of intersection of the first straight subsection and the second straight subsection would intersect the point of reflection of the acoustic signal on the first signal path on the reflection surface. Naturally, this is a model. In practice, the first signal path is not just a point wide and therefore the point of reflection is rather an area in the region of the reflection surface.

In a first embodiment of the invention, the measuring tube has an elliptical, especially circular, cross section, wherein the measuring tube axis then can also be referred to as the principal-, central- or longitudinal axis. The principal flow direction of the medium in the measuring tube coincides with the measuring tube axis.

In an additional embodiment, the dimensions of the measuring tube are a multiple of the dimensions of the ultrasonic transducer, respectively the transmitter and/or receiver. Thus, in the case of a round measuring tube and disk shaped transmitters and/or receivers, the diameter of the measuring tube is at least two times, especially five times, especially at least ten times, greater than the diameter of the disk of the transmitters and/or receivers. If the measuring tube has, for example, an angular, especially rectangular, especially square cross section, and/or the ultrasonic transducers as transmitter and/or receiver have some different shape, such as e.g. likewise rectangular, then the surface area of the cross section of the lumen of the measuring tube is at least four times greater than the surface area of the ultrasonic transducer, or even 25 times or even at least 100 times greater.

In an embodiment of the ultrasonic, flow measuring device of the invention, a travel-time difference method is used for flow measurement. The ultrasonic, flow measuring device of the invention is embodied correspondingly suitable therefor.

In a further development of the invention, the first reflection surface and/or every other reflection surface in the or on the measuring tube are so arranged relative to the transmitter and receiver that the first and second planes intersect in a line, which extends parallel to the measuring tube axis.

In an additional further development of the ultrasonic, flow measuring device of the invention, the first reflection surface and/or every other reflection surface in the or on the measuring tube are so arranged relative to the transmitter and receiver that the line, in which the first and second planes intersect, lies in the first reflection surface and/or that the angle of intersection of the first and second planes lies between 2° and 175° especially between 20° and 120°.

In a further development, the first plane extends in a first half of the measuring tube and the second plane extends in a second half of the measuring tube, wherein the first half of the measuring tube has no overlap with the second half of the measuring tube. The first reflection surface and/or every other reflection surface are arranged in the or on the measuring tube correspondingly relative to the transmitter and receiver.

Alternatively, the longer part of the beam portions is located, in each case, in different tube halves.

In an additional further development of the invention, there is a third plane, in which the measuring tube axis and a line, in which the first and second planes intersect, lie, relative to which third plane the first and second planes have the same angle. This plane separates the first half of the measuring tube from the second half of the measuring tube.

In an additional further development of the invention, the acoustic signal incident on the first reflection surface travels along the first straight subsection and the acoustic signal reflected on the first reflection surface travels along the second straight subsection. The first reflection surface is correspondingly arranged in the measuring tube. Especially, the acoustic signal traveling along the first straight subsection and incident on the first reflection surface and the acoustic signal traveling along the second straight subsection and reflected on the first reflection surface have the same length as projected on the measuring tube axis. In a further development, the acoustic signal incident on the first reflection surface and traveling along the first straight subsection and the acoustic signal reflected on the first reflection surface and traveling along the second straight subsection enclose an angle, as projected on a cross section of the measuring tube, which lies between 2° and 175°, especially between 20° and 120° and/or an angle, as projected on the third plane, which lies between 2° and 175°, especially between 20° and 120° and/or they form, in each case, an angle between 1° and 88° with the third plane. As usual, the smallest angle is the angle of intersection, when two lines intersect in space. In a right angled, triaxial coordinate system, thus, at least one the direction vector of the one beam portion counter to a direction vector of the other beam portion.

In an additional, further development of the invention, the first value of the sum of all lengths of all first subsections of the first signal path as projected on the measuring tube axis and having the first separation from the measuring tube axis, which first subsections extend in the first plane, are calculated with a calculational formula as a function of the first separation. For example, the sums of the values of the lengths of all subsections of the first signal path as projected on the measuring tube axis and having the same separation from the measuring tube axis, but extending in the different planes, are proportional to weighting factors for weighting the travel time of the acoustic signal along a measuring path with the same separation from the measuring tube axis of an analog multipath, ultrasonic, flow measuring device with a plurality of measuring paths with the same distances as the different subsections of the first signal path from the measuring tube axis. If the measuring paths of the multipath, ultrasonic, flow measuring device have the same angle to the measuring tube axis, the weighting factors are calculated, for example, according to the Gauss-Jacobi or the OWICS method, such as they are described in the dissertation of A. Voser: "Analyse und Fehleroptimierung der mehrpfadigen akustischen Durchflussmessung in Wasserkraftanlagen (ANALYSIS AND ERROR OPTIMIZING OF MULTIPATH, ACOUSTIC, FLOW MEASUREMENT IN HYDROPOWER PLANTS)", ETH Zurich Dissertation No. 13102, 1999, as a function of the respective separations from the measuring tube axis. Analogously, the subsections have predetermined lengths, which are so dimensioned that the sums of all values of the lengths of all subsections of the first signal path as projected on the measuring tube axis and having the same separation from the measuring tube axis as well as lying in the different planes are proportional to the weighting factors of an analog multipath, ultrasonic, flow measuring device.

In an additional form of embodiment, an ultrasonic, flow measuring device of the invention includes a transmitter and two receiver. The transmitter sends an acoustic signal intersecting the measuring tube axis perpendicularly in the measuring tube. At a first reflector, which has two reflection surfaces, the acoustic signal is reflected into two subsections. Each of the subsections has a directional component parallel to the measuring tube axis, one subsection in the direction of the flow of the fluid in the measuring tube parallel to the measuring tube axis, the other subsection counter to the flow direction of the fluid in the measuring tube. Both subsections have, furthermore, directional components parallel to one another and opposed to one another, in each case, perpendicular on the measuring tube axis and perpendicular to the direction of incidence of the acoustic signal in the measuring tube. Then, the divided acoustic signal can be reflected on additional reflection surfaces according to the invention. Although the acoustic signal is divided at the first reflector, it is here nevertheless referred to as continuing on a signal path.

BRIEF DESCRIPTION OF THE DRAWINGS

The invention permits numerous forms of embodiment. Some thereof will now be explained in greater detail based on the drawing. Equal elements are provided in the figures of the drawing with equal reference characters. The figures of the drawing show as follows.

DETAILED DISCUSSION IN CONJUNCTION WITH THE DRAWINGS

Figure 1A:
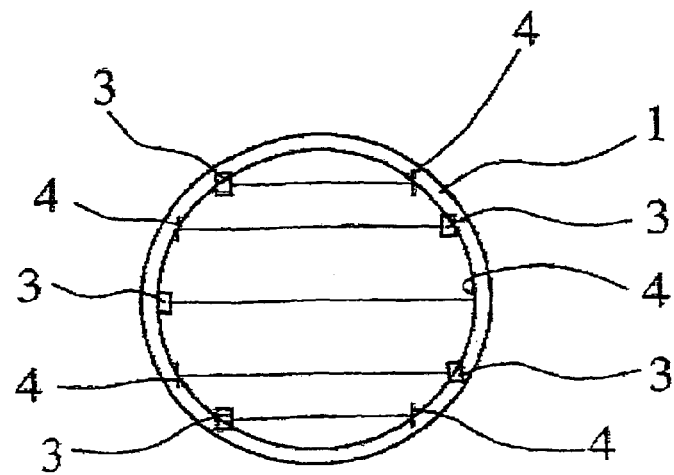
FIG. 1a is a multipath, ultrasonic, flow measuring device of the state of the art.
Figure 1B:
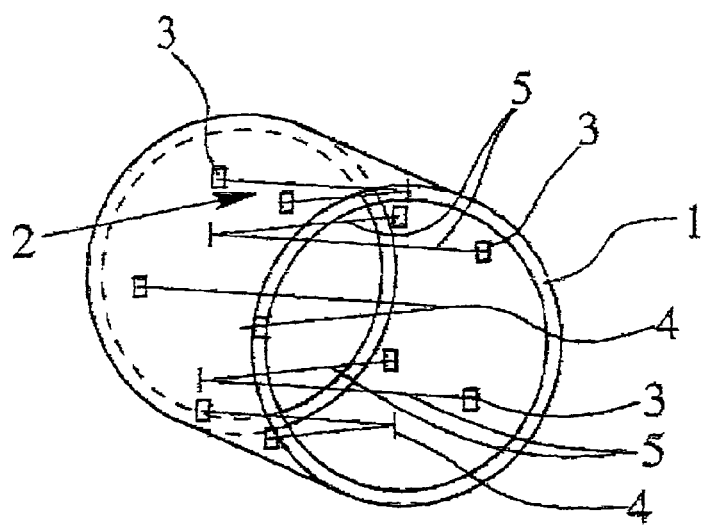
FIG. 1b Is a perspective view of the multipath, ultrasoni, flow measuring device of the state of the art.

FIG. 1a shows a multipath, ultrasonic, flow measuring device of the state of the art in cross section through the measuring tube 1. FIG. 1b shows the same multipath, ultrasonic, flow measuring device perspectively. Both figures are taken from DE 10 2007 004 936 B4. The multipath, ultrasonic, flow measuring device includes, in such case, a measuring tube 1 and ten ultrasonic transducers 2, which together with five ultrasonic reflectors 3, form five V-shaped signal paths. In each case, two ultrasonic transducers 2 form an ultrasonic transducer pair. Each of the five V-shaped signal paths is formed of two straight subsections, a first straight subsection from the first ultrasonic transducer 2 of its ultrasonic transducer pair to the associated ultrasound reflector 3 and a second straight subsection from the associated ultrasound reflector 3 to the second ultrasonic transducer 2 of its ultrasonic transducer pair. Each of these ultrasonic transducer pairs lies with the associated ultrasound reflector 3 in a plane, which has a predetermined separation from the measuring tube axis. Also, the two straight subsections of the respective V-shaped signal path lie in these, thus, five planes, which are spanned by the five V-shaped signal paths, and the five planes extend parallel to one another in the measuring tube.

Figure 2:
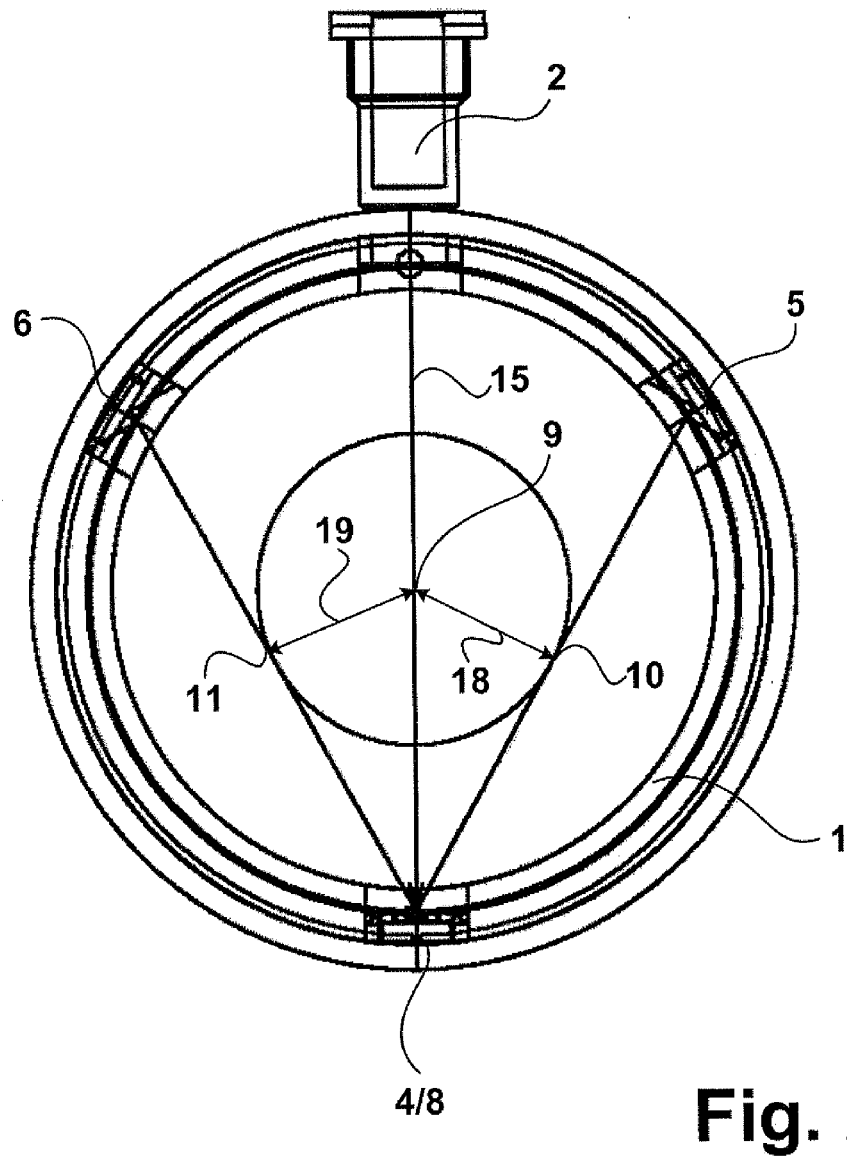
FIG. 2 Is an ultrasonic, flow measuring device of the invention in cross section.
Figure 3:
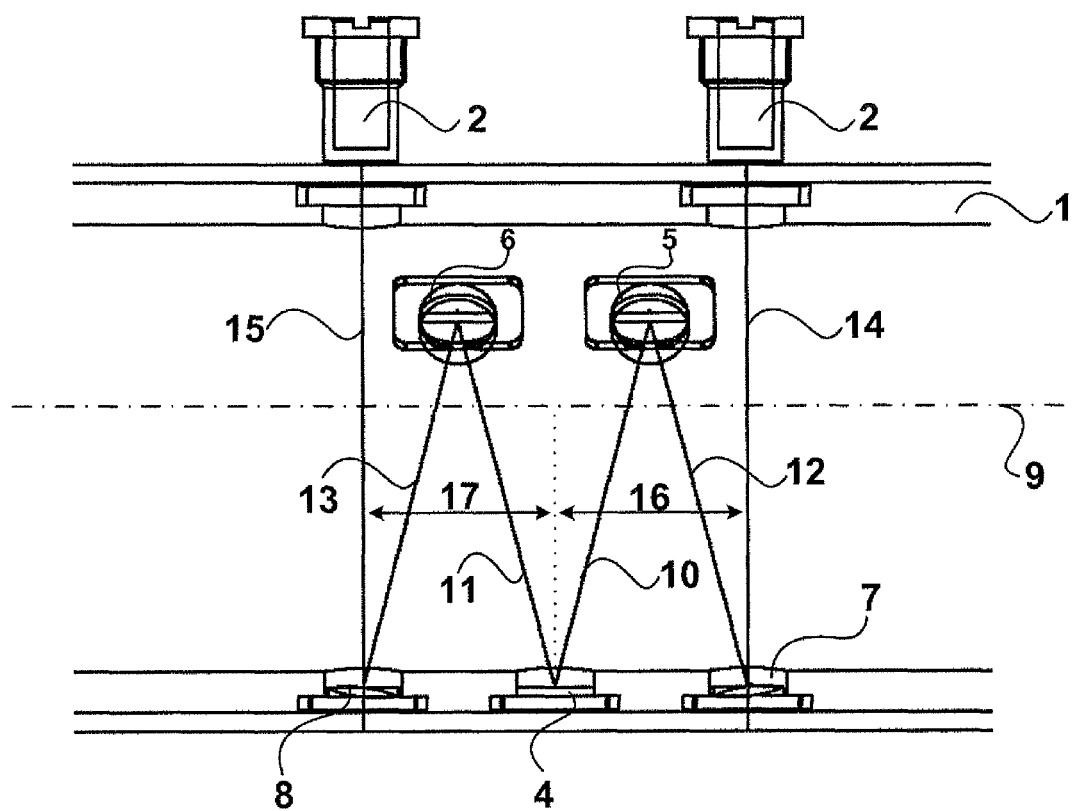
FIG. 3 is an ultrasonic, flow measuring device of the invention in longitudinal section.

FIG. 2 and FIG. 3 show an embodiment of an ultrasonic, flow measuring device of the invention. The cross- and longitudinal sections through the measuring tube 1 show two ultrasonic transducers 2, which, as transmitter and receiver, transmit an acoustic signal on a first signal path and/or receive such on such signal path. They form, thus, the beginning and the end of the first signal path. The signal path is composed, in such case, of a plurality of straight subsections, which extend between transmitter and receiver and reflection surfaces lying therebetween.

Starting from the transmitter 2 in this example of an embodiment, the acoustic signal travels along a fifth subsection 14 to a fourth reflection surface 7. In doing so, it passes perpendicularly through the measuring tube axis 9. At the fourth reflection surface 7, the acoustic signal is reflected on the first signal path along a third subsection 12 to the second reflection surface 5. There, the signal is, in turn, reflected to travel along a first subsection 10 in the direction of the first reflection surface 4.

The first subsection 10 and the third subsection 12 lie, in such case, in a first imaginary plane parallel to the measuring tube axis 9. Both subsections 10 and 12 have the same first separation 18 from the measuring tube axis 9. Here, also the first plane has this first separation from the measuring tube axis 9. The sum of the lengths of the two said subsections 10 and 12 as projected on the measuring tube axis 9 has, in such case, a predetermined value. Here, the two subsections 10 and 12 are additionally equally long and have the same length projected on the measuring tube axis 9. The sum of the lengths of the subsections (which lie in the first plane) as projected on the measuring tube axis 9 is here equal to the separation 16 of the two reflection points on the first and fourth reflection surfaces 4 and 7, and is drawn correspondingly.

The first reflection surface 4 reflects the acoustic signal of the first signal path along a second straight subsection 11 to a third reflection surface 6, from where a fourth subsection 13 leads to a fifth reflection surface 8. Again, the second and fourth subsections 11 and 13 lie in an imaginary, second plane, which extends parallel to the measuring tube axis 9. The second and fourth subsections 11 and 13 have, in each case, the same separation 19 from the measuring tube axis 9, which is equally large as the above mentioned separation 18 of the first and third subsection 10 and 12 from the measuring tube axis 9. The length of the distance 17 between the reflection on the first reflection surface 4 and the reflection on the fifth reflection surface 8 corresponds to the sum of all lengths of all subsections 11 and 13 as projected on the measuring tube axis. Subsections 11 and 13 extend in an imaginary second plane different from the first plane. The second plane is also parallel to the measuring tube axis 9. Subsections 11 and 13 have the same predetermined separation 19 from the measuring tube axis 9. The length of the distance 17 has the same predetermined value different from zero, such as the corresponding sum of all lengths of all subsections 10 and 12 as projected on the measuring tube axis. Subsections 10 and 12 extend in the first plane parallel to the measuring tube axis 9 and have the same predetermined separation 18 from the measuring tube axis 9.

From the fifth reflection surface 8, the acoustic signal is finally reflected along a sixth subsection 15 to the receiver 2. The sixth subsection 15 is perpendicular to the measuring tube axis 9.

The perpendicular fifth and sixth subsections 14 and 15 lie in this form of embodiment in a third plane. The third plane separates the measuring tube 1 here into two equally large, non-overlapping halves. Along with that, it divides the first reflection surface 4 in a line, in which here the first and second planes intersect. The first and second plane have correspondingly, in each case, an equally large angle from the third plane, which can, in each case, be especially in the range 10-60°, and can have especially the value 30°. The angles the subsections relative to the measuring tube axis projected on a longitudinal section, here on the third plane, lie, as usual in the case of ultrasonic, flow measuring devices, as well as also here, between 0°/180° and 90°, especially between +/−5° and +/−60°, so that for travel-time difference measurement the subsections have a directional component in or counter to the flow direction of the fluid.

Preferably, concave mirrors can be applied for reflecting the rays in the measuring tube, in order to avoid dispersion of the ultrasonic signals in the case of high flow velocities.

The invention claimed is:

1. An ultrasonic, flow measuring device, comprising:
a measuring tube having a straight measuring tube axis;
a transmitter for sending an acoustic signal on a first signal path;
a receiver for receiving the acoustic signal on the first signal path; and
at least a first reflection surface, on which the acoustic signal is reflected on the first signal path, in each case, at least once, wherein:
the acoustic signal incident on the first reflection surface and the acoustic signal reflected on the first reflection surface travel, in each case, along a straight subsection of the first signal path;
said transmitter, said receiver and said first reflection surface are so oriented with respect to one another and arranged in or on the measuring tube that the acoustic signal on the first signal path from a first transmitter to a first receiver is so reflected on the first reflection surface that the sum of all lengths of all subsections as projected on the measuring tube axis, extending in a first plane parallel to the measuring tube axis, and having a predetermined separation other than zero from the measuring tube axis has a predetermined value different from zero;
the sum of all lengths of all subsections as projected on the measuring tube axis, extending in a second plane different from the first plane and parallel to the measuring tube axis, and having the same predetermined separation from the measuring tube axis has the same predetermined value;
the first plane extends in a first half of the measuring tube and the second plane extends in a second half of the measuring tube; and
the first half of the measuring tube does not overlap with the second half of the measuring tube.

2. The ultrasonic, flow measuring device as claimed in claim 1, wherein:
the first and second planes intersect in a line, which extends parallel to the measuring tube axis.

3. The ultrasonic, flow measuring device as claimed in claim 2, wherein:
the line, in which the first and second planes intersect, lies in the first reflection surface.

4. The utrasonic, flow measuring device as claimed in claim 2, wherein:
the angle of intersection of the first and second planes lies between 2° and 175° , especially between 45° and 75°.

5. The ultrasonic, flow measuring device as claimed in claim 1, wherein:
there is a third plane, in which the measuring tube axis and a line, in which the first and second planes intersect, lie, relative to which third plane the first and second planes have the same angle.

6. The ulrasonic, flow measuring device as claimed in claim 1, wherein:
the straight subsection of the acoustic signal incident on the first reflection surface and the straight subsection of the acoustic signal reflected on the first reflection surface have, in each case, the same first separation from the measuring tube axis.

7. The ultrasonic, flow measuring device as claimed in claim 6, wherein:
the straight subsection of the acoustic signal incident on the first reflection surface and the straight subsection of the acoustic signal reflected on the first reflection surface enclose an angle, as projected on a cross section of the measuring tube, which lies between 2° and 175° , especially between 20° and 120°.

8. The ultrasonic, flow measuring device as claimed in claim 7, wherein:
the straight subsection of the acoustic signal incident on the first reflection surface and the straight subsection of the acoustic signal reflected on the first reflection surface enclose an angle projected on the third plane, which lies between 2° and 175°, especially between 20° and 120°.

9. The ultrasonic, flow measuring device as claimed in claim 7, wherein:
the straight subsection of the acoustic signal incident on the first reflection surface and the straight subsection of the acoustic signal reflected on the first reflection surface form, in each case, an angle between 10° and 60° , especially between 20° and 40°, with the third plane.

10. The ultrasonic, flow measuring device as claimed in claim 1, wherein:
the predetermined value of the sum of all lengths of all subsections of the first signal path as projected on the measuring tube axis and extending in the first plane are calculates with a calculational formula as a function of the predetermined separation of these subsections from the measuring tube axis.

* * * * *